United States Patent

Giuliano

[11] Patent Number: 5,613,422
[45] Date of Patent: Mar. 25, 1997

[54] ESPRESSO COFFEE MAKER

[75] Inventor: Mario Giuliano, Cuneo, Italy

[73] Assignee: Faema S.P.A., San Donato Milanese, Italy

[21] Appl. No.: 360,753

[22] PCT Filed: Jun. 21, 1993

[86] PCT No.: PCT/EP93/01572

§ 371 Date: Feb. 21, 1995

§ 102(e) Date: Feb. 21, 1995

[87] PCT Pub. No.: WO94/00045

PCT Pub. Date: Jan. 6, 1994

[30] Foreign Application Priority Data

Jun. 24, 1992 [IT] Italy .................. MI92A1544

[51] Int. Cl.$^6$ ............................ A47J 31/24
[52] U.S. Cl. .................. 99/281; 99/295; 99/299
[58] Field of Search .............. 99/295, 299, 300, 99/302 R, 302 P, 279, 280, 281, 282; 426/433

[56] References Cited

U.S. PATENT DOCUMENTS

| 3,824,914 | 7/1974 | Casiano | 99/302 R |
| 4,551,611 | 11/1985 | Longo | 99/302 R |
| 4,757,753 | 7/1988 | Pandolfi | 99/302 R |
| 5,083,504 | 1/1992 | Koga | 99/295 |
| 5,127,318 | 7/1992 | Selby | 99/295 |

FOREIGN PATENT DOCUMENTS

| 0540440 | 5/1993 | European Pat. Off. . |
| 1410805 | 9/1965 | France . |
| 2642634 | 8/1990 | France . |
| 2747990 | 1/1979 | Germany . |
| 168107 | 7/1991 | Japan . |
| 99541 | 3/1992 | Japan . |
| 365194 | 12/1962 | Switzerland . |
| 900690 | 7/1962 | United Kingdom . |

Primary Examiner—Robert W. Jenkins
Attorney, Agent, or Firm—Sughrue, Mion, Zinn, Macpeak & Seas

[57] ABSTRACT

An espresso coffee maker is provided with a heat exchanger, a coffee dispenser unit and a water supply system in conjunction with the heat exchanger for supplying heated water to the coffee dispenser unit. The water supply system feeds cold water to the heat exchanger and heated water is delivered to the dispenser unit. A heated water return pipe is connected to the heat exchanger from the dispenser unit to form a recirculation circuit between the heat exchanger and the dispenser unit through which the heated water flows by natural convection to transfer heat from the heat exchanger to the dispenser unit. The water supply system includes at least one heat operated control valve incorporated in the recirculation circuit. The valve is provided with a chamber and a shutter is movable in the chamber to control the circulation of the water. A bias element made of a shape-memory material urges the shutter towards a normal position throttling down the transfer port when the temperature of the water through the recirculation circuit is above the transition temperature of the shape-memory material.

12 Claims, 7 Drawing Sheets

ESPRESSO COFFEE MAKER

FIELD OF THE INVENTION

This invention relates to an "espresso" coffee maker of a top-quality professional type.

BACKGROUND ART

The quality of coffee prepared on an "espresso" coffee maker is dependent on a variety of factors, which are tied both to the coffee used, namely its blend, quality and grinding grade, and the coffee maker itself, specifically the machine processing rate, operating pressure and water temperature. As may be appreciated, the choice of the machine-dependent parameters will be influenced by the coffee-dependent ones; it is for the designer to set these parameters and design the machine to keep such parameters continual as far as possible, irrespective of the operating conditions encountered, which may vary a great deal.

In particular, the temperature of the dispensation water flowed through the percolator loaded with a charge of ground coffee is recognized to be critical. Also well-recognized is that that temperature is quite difficult to control because it is readily affected by the machine own conditions of operation.

To provide ideal dispensation conditions, the machine may be equipped with indicator gauges to tell the operator whether the time is right for coffee dispensation or additional time should be allowed in order for the optimum temperature to be attained. This approach would only suit those applications where operators of adequate skill can be detached to supervise the coffee-making operation and continuously monitor the machine, and especially where the downtime involved in waiting for the ideal conditions to set in would not be objectionable.

But since such conditions are hardly met in practice, it remains for the machine itself to maintain best heating conditions for coffee making.

Accordingly, certain water supply systems have been developed which, additionally to supplying the dispenser units, provide for heat exchanges to occur within the machine between areas at different temperatures liable to swing in opposite directions during operation of the machine, thereby compensating to some extent for local temperature variations.

Such water supply systems are calibrated, as by the inclusion of waterflow throttling or metering passageways, for normal operating conditions; their effectiveness being lost under extreme conditions, such as during the machine turn-on transient or where large amounts of water are to be delivered in close succession (e.g. to dispense weaker coffee, as may typically be the case in Northern Countries).

A coffee maker is disclosed by DE-A-2747990, where a water supply system is provided including delivery and return pipes between a boiler and dispensing units; circulation of water in the water supply system helps in keeping dispensing units warm.

Another coffee maker is known from CH-A-365194, where in the dispensing units warm water and cold water are mixed under control of an automatic valve, driven by the temperature of the warm water.

BRIEF DESCRIPTION OF THE INVENTION

To ensure smooth operation also under such conditions, this invention provides an "espresso" coffee maker which comprises a heat exchanger, at least one coffee dispenser unit, and a water supply system operated under heat exchange conditions for supplying water to the coffee dispenser unit, characterized in that the water supply system includes at least one heat operated control valve for controlling the waterflow through the water supply system.

Such a valve, while being a simple component that would not burden the machine with unbearable added cost, enables the waterflows through the water supply system to be controlled automatically to also ensure optimum dispensation under the aforesaid extreme conditions.

The heat-operated valve may be one of several different types, such as a simple bimetallic element; preferably, the heat operated valve includes a bias element formed from a shape-memory material.

Shape-memory materials typically exhibit elastic properties above a given temperature, called the transition temperature, and yielding properties below that temperature; additionally thereto, in moving from the yielding condition to the elastic condition as temperature goes up, they resume their original shape, as if they had "stored" such shape, and "forgotten"—so to speak—the seemingly plastic deformations they had undergone while at a low temperature (hence their name).

Such materials have long been known, and have found extensive application especially for highly sophisticated technologies, such as robotic and (orthopaedic and dental) implantation.

Known among such materials are nickel/titanium alloys, which are preferred for this invention because in accordance with the sanitary requirements for direct contact with food products.

According to a more specific aspect of the invention, the water supply system comprises a cold water feed pipe to the heat exchanger, a pump connected in the water feed pipe, a heated water delivery pipe to the dispenser unit from the heat exchanger, a heated water return pipe to the heat exchanger from the dispenser unit, said delivery and return pipes forming a heated water thermosiphon recirculation circuit between the heat exchanger and the dispenser unit wherethrough heated water is flowed by natural convection to transfer heat from the heat exchanger to the dispenser unit for heating the latter.

In such a machine, according to the invention, the heat operated valve is incorporated to the thermosiphon recirculation circuit to wide open the heated water passageway when the water through the recirculation circuit is below a predetermined tripping temperature, and throttle down the passageway when above the tripping temperature.

In this way, the heat operated valve will only throttle the flow when above the tripping temperature, and maintain thermally balanced conditions during normal operation; should the temperature drop below the tripping level for a reason whatever, then the valve would allow full water flow, thereby providing increased thermosiphon flow and, hence, faster heating of the dispenser unit.

For that function, a preferred embodiment of the heat operated valve includes a chamber connected serially in the recirculation circuit, a transfer port for the waterflow through the chamber, a movable shutter in the chamber between a normal position where it partly covers the port and a working position where it uncovers the port, a spring urging the shutter toward its working position against the bias element made of a shape-memory material, the action of the bias element becoming dominant above the transition temperature of the shape-memory material, and said transition temperature being equal to the tripping temperature.

According to a further aspect of the invention, the water supply system comprises a cold water feed pipe to the heat exchanger, a pump connected in the water feed pipe, a heated water delivery pipe from the heat exchanger to the dispenser unit, and a mixer unit on the heat exchanger for controlling the cold water inflow to the heat exchanger and its mixing with heated water directed to the delivery pipe.

In such a machine according to the invention, the heat operated valve is incorporated to the mixer unit to allow direct outflow of cold water from the feed pipe to the delivery pipe when the water inside the heat exchanger is at a temperature above a predetermined tripping temperature, and inhibit said outflow when below the tripping temperature.

Thus, the heat operated valve will only enable some of the cold feed water to become mixed with the heated water from the heat exchanger on the tripping temperature being reached, and maintain a thermally balanced condition during normal operation; should the water temperature within the heat exchanger drop for any reason below said tripping level, the valve would inhibit the mixing, thereby directing all of the feed water into the heat exchanger and only water from the heat exchanger into the delivery pipe.

For that function, a preferred embodiment of the mixer unit comprises a mixing chamber confronting the heat exchanger and being communicated to the water feed pipe and the delivery pipe, a tubular injector in continuation of the feed pipe from the mixing chamber to the heat exchanger, mixing ports in the injector wall at the location of the mixing chamber, a shutter in the form of a slidable sleeve adapted to slide along the injector between a normal position where it uncovers the mixing ports and a working position where it covers the ports, a spring urging the shutter toward the working position against the bias element made of a shape-memory material, said injector forming, in combination with the mixing ports, the sleeve-like shutter, the spring and the bias element, the heat operated control valve, the action of the bias element becoming dominant above the transition temperature of the shape-memory material, and said transition temperature being equal to the tripping temperature.

According to a further aspect of the invention, the water supply system comprises a cold water feed pipe to the heat exchanger, a pump connected in the water feed pipe, a heated water delivery pipe from the heat exchanger to the dispenser unit, a mixer unit on the heat exchanger for controlling the inflow of cold water to the heat exchanger and its mixing with heated water directed into the delivery pipe, a heated water return pipe from the dispenser unit to the heat exchanger, said delivery and return pipes forming a thermosiphon recirculation circuit for the heated water between the heat exchanger and the dispenser unit wherethrough heated water is flowed by natural convection to transfer heat from the heat exchanger to the dispenser unit and have the latter heated.

In such a machine, according to the invention, a first heat operated valve is incorporated to the thermosiphon recirculation circuit to wide open the passageway for the heated water when the water in the recirculation circuit is below a predetermined first tripping temperature, and partly close off said passageway when above the first tripping temperature, and wherein a second heat operated valve is included to the mixer unit to allow cold water to flow directly from the water feed pipe to the water delivery pipe when the water in the heat exchanger is above a predetermined second tripping temperature, and prevent it from flowing when the water in the heat exchanger is at a temperature below said second tripping temperature.

Thus, the two heat operated valves perform both of the previously described functions. Specifically, the first heat operated valve will only throttle the flow with the heat exchanger water at a temperature above the tripping temperature, while maintaining a thermally balanced condition during normal operation; should the temperature drop below said tripping level, for a reason whatever, then the first valve would leave the water flow unrestricted, thereby enabling increased thermosiphon flow and, hence, the dispenser unit to become heated at a faster rate. The second heat operated valve will only enable some of the cold supply water to become mixed with the heated water from the heat exchanger in a condition above the tripping temperature, and maintain a condition of thermal balance during normal operation; should the temperature of the water within the heat exchanger drop below said tripping level for any reason, then the valve would inhibit the mixing and direct all of the feed water into the heat exchanger, thereby only directing water from the heat exchanger into the delivery pipe.

To have that function performed, in a preferred embodiment, the first heat operated valve comprises a chamber connected serially in the recirculation circuit, a transfer port for flowing water through the chamber, a movable shutter in the chamber between a normal position where it partially covers the port and a working position where it uncovers the transfer port, a first spring urging the shutter toward the working position against a first bias element made of a shape-memory material, the action of the first bias element overcoming the action of the first spring when above the transition temperature of the shape-memory material, said transition temperature being the first tripping temperature, and wherein the mixer unit comprises a mixing chamber confronting the heat exchanger and being communicated to the water feed pipe and the delivery pipe, a tubular injector in continuation of the water feed pipe from the mixing chamber to the heat exchanger, mixing ports through the injector wall at the location of the mixing chamber, a shutter in the form of a slidable sleeve along the injector between a normal position where it uncovers the ports and a working position where it covers the ports, a second spring urging the sleeve-like shutter toward the working position against a second bias element made of a shape-memory material, said injector forming, in combination with the mixing ports, the sleeve-like shutter, the second spring, and the second bias element, a second heat operated control valve, the action of the second bias element becoming dominant over that of the second spring when above the transition temperature of the shape-memory material, and said transition temperature being the second tripping temperature.

According to a further aspect of the invention, the functions performed by the first and the second heat operated valves may be served by a single valve. For this purpose, a multi-function heat operated valve is incorporated to the mixer unit to both prevent cold water from flowing directly into the delivery pipe from the feed pipe and wide open the passageway for the heated water from the heat exchanger to the delivery pipe when the water within the heat exchanger is below a predetermined temperature, and allow some cold water to flow directly from the feed pipe into the delivery pipe and partially inhibit heated water from flowing from the heat exchanger into the delivery pipe when the water within the heat exchanger is at a higher temperature than the tripping temperature.

To provide that function, a preferred embodiment of the mixer unit comprises a mixing chamber confronting the heat exchanger and being communicated to the water feed pipe and the delivery pipe, a tubular injector in continuation of the water feed pipe from the mixing chamber to the heat exchanger, mixing ports through the injector wall at the location of the mixing chamber, a transfer port between the heat exchanger and the mixing chamber, a shutter in the form of a slidable sleeve along the injector between a normal position where it uncovers the mixing ports and partly covers the transfer port and a working position where it covers the mixing ports and uncovers the transfer port, a spring urging the shutter toward its working position against the bias element made of a shape-memory material, said injector forming, in combination with the mixing port, the transfer port, the sleeve-like shutter, the spring and the bias element, the multi-function heat operated valve, the action of the bias element becoming dominant above the transition temperature of the shape memory material, and said transition temperature being equal to the tripping temperature.

According to a further aspect of the invention, the dispenser unit is formed within a metal body which is attached directly to the heat exchanger, and the water supply system comprises a cold water feed pipe to the heat exchanger, a pump connected in the feed pipe, a heated water delivery pipe from the heat exchanger to the dispenser unit formed in the body, and a pre-heating/cooling section of the water feed pipe formed in the body of the dispenser unit to limit the heating thereof.

Such a machine according to the invention has the heat operated valve located in the pre-heating/cooling section of the water feed pipe to prevent water from flowing through the pre-heating/cooling section with the water in the delivery pipe at a lower temperature than a predetermined tripping temperature, and a bypass section in the water feed pipe for bypassing the pre-heating/cooling section, and a control valve in the bypass section to only admit flow through said section from the pump to the heat exchanger and this only with the heat operated valve in its closed condition.

Thus, the heat operated valve will not alter the thermally balanced condition during normal operation; but upon the water temperature in the delivery pipe dropping below the tripping temperature, the valve action will cause the cold feed water to be conveyed directly into the heat exchanger, thereby preventing it from going through the dispenser unit body and preventing additional cooling of the dispenser unit.

To have that function performed, a preferred embodiment of the heat operated valve comprises a main chamber provided serially in the pre-heating/cooling section, a waterflow port formed in the main chamber, a pilot chamber provided serially in the delivery pipe, a transfer port between the two chambers, a stem adapted to slide tightly within the transfer port and extending through either chambers, a shutter carried on the stem within the main chamber, a cap carried on the stem within the pilot chamber, the stem being movable between a normal position where the shutter uncovers the waterflow port and a working position where the shutter covers the waterflow port, a spring in the pilot chamber urging the stem with the shutter toward its working position against the shape-memory bias element, the action of the bias element becoming dominant when above the transition temperature of the shape-memory material, and said transition temperature being equal to the tripping temperature.

All of the aforementioned tripping temperatures would, of course, be selected to suit each individual case according to valve type, machine type, and the principal use for which the machine is intended; in all cases, such temperature should be within the range of 80° to 96° C., preferably of 88° to 95° C.

Further features and advantages of an "espresso" coffee maker according to the invention will become more clearly apparent from the following description of some preferred embodiments thereof, given with reference to the accompanying drawing figures.

DETAILED DESCRIPTION OF PREFERRED EMBODIMENTS

Figure 1:
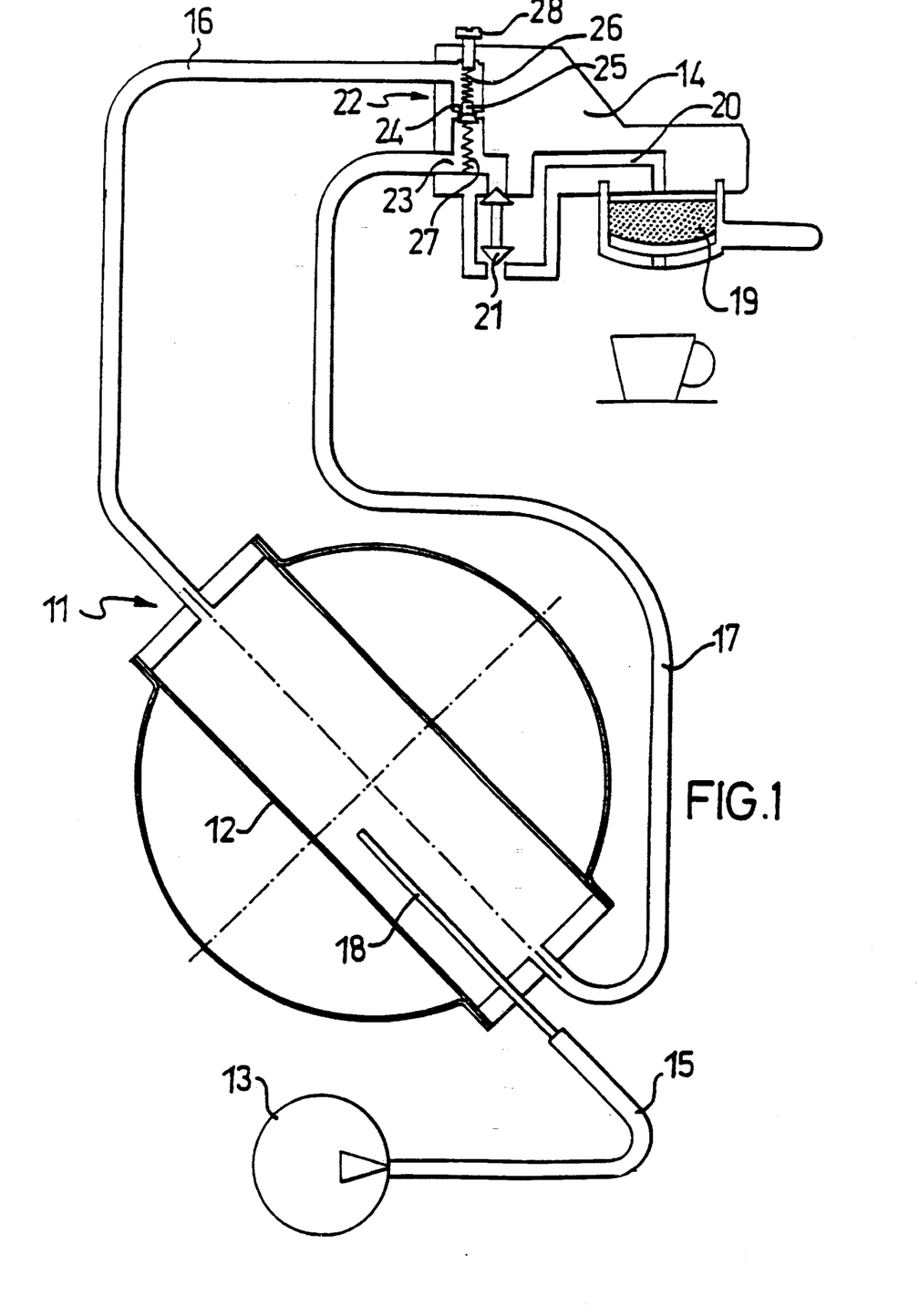
FIG. 1 is a schematic view of the water supply system in a coffee maker embodying this invention.

The first coffee maker, as shown in FIG. 1, comprises a water supply system, generally denoted by 11, which interconnects a heat exchanger 12, water feed pump 13, and dispenser unit 14. The heat exchanger 12 is mounted within a boiler 12a containing overheated water.

As regards the dispenser unit, it is a known fact that a coffee maker may include several dispenser units, being different from or more frequently identical with one another; however, for convenience of illustration, throughout this specification and the appended claims, reference will be made to one such dispenser unit, it being understood that a number of dispenser units having corresponding features may be provided in actual practice.

The water supply system 11 comprises a water feed pipe 15 between the pump 13 and the heat exchanger 12, a water delivery pipe 16, and a return pipe 17 between the heat exchanger 12 and the dispenser unit 14. The feed pipe 15 is open to the heat exchanger 12 through an injector 18 reaching into the central region of the heat exchanger 12. The two delivery 16 and return 17 pipes open into the heat exchanger 12 from opposite sides thereof and interconnected at the dispenser unit 14, thereby forming a heated water thermosiphon recirculation circuit between the heat exchanger 12 and the dispenser unit 14. The dispenser unit 14 accommodates a percolator holder 19 connected to the delivery 16 and return 17 pipes by a dispensing pipe 20 which is controlled by a dispensation valve 21.

The water supply system 11 further includes a heat operated valve 22 for controlling the waterflow. The valve 22 comprises a chamber 23 formed serially in the thermosiphon recirculation circuit, a water transfer port 24 which divides the chamber 23 into two parts, and a shutter 25 which is guided for movement within the chamber 23 between a normal position (shown in FIG. 1) where it partly covers the transfer port 24 and a working position where it uncovers the port 24. On the shutter 25 there act in opposite directions a spring 26 and a bias element 27 in the form of a spring made of a shape-memory material; the spring 26 urges the shutter 25 toward its working position, whereas the bias element 27 urges the shutter 25 toward its normal position. The chamber 23 is in communication with the delivery 16, return 17, and dispensing 20 pipes.

The action of the bias element 27 overcomes the elastic force of the spring 26 when above the transition temperature of the shape-memory material; when below that transition temperature, however, the bias element 27 would lose its elastic properties, so that the action of the spring 26 becomes dominant. Accordingly, the transition temperature of the shape-memory material of the bias element 27 will correspond to the tripping temperature of the heat operated valve 22.

The heat operated valve 22 also includes an adjustment screw 28 for adjusting the action of the spring 26.

The first coffee maker shown in FIG. 1 operates as follows.

Under normal conditions of operation, the heat operated valve 22 will perform a throttling function in the thermosiphon recirculation circuit by virtue of the shutter 25 partially covering the transfer port 24. Thus, irrespective of coffee dispensation, a thermosiphon or natural convective flow is established between the heat exchanger 12 and the dispenser unit 14 through the thermosiphon recirculation circuit formed by the delivery 16 and return 17 pipes. The amount of the flow is dependent, inter alia, on the amount of throttling provided by the shutter 25, which should, therefore, be accurately sized.

The aforesaid thermosiphon flow keeps the dispenser unit 14 in a heated state at a lower temperature than the temperature of the heat exchanger 12 (which temperature is dependent on the rate of heat transfer from the boiler 12a). In fact, the temperature within the boiler 12a should be sufficiently high to also permit of steam to be dispensed from a specially provided nozzle (not shown) to prepare, for example, "cappuccino" milk coffee; conversely, the temperature of the dispenser unit 14 should be kept sufficiently low to allow the water from the heat exchanger 12 to the dispenser unit to be cooled (transferring heat to the dispenser unit 14) down to an optimum value for coffee making.

At slow working rates, there exists a tendency of the dispenser unit 14 to lose heat and of the water from the heat exchanger 12 to rise in temperature; conversely, at fast working rates, there is a tendency of the dispenser unit 14 to overheat and of the water from the heat exchanger 12 to drop in temperature. As a result, when the water supply system is properly designed, the coffee maker will tend to be self-regulating.

In the event, for example, of repeated dispensation of much diluted coffee, or at the starting stage, the heat exchanger 12 may be unable to supply sufficiently heated water to the dispenser unit 14; in that case, the heat operated valve 22 would wide open the transfer port 24, which results in the thermosiphon flow being increased and the temperature of the dispenser unit 14 rising sharply, so that normal conditions can be restored.

Figure 2:
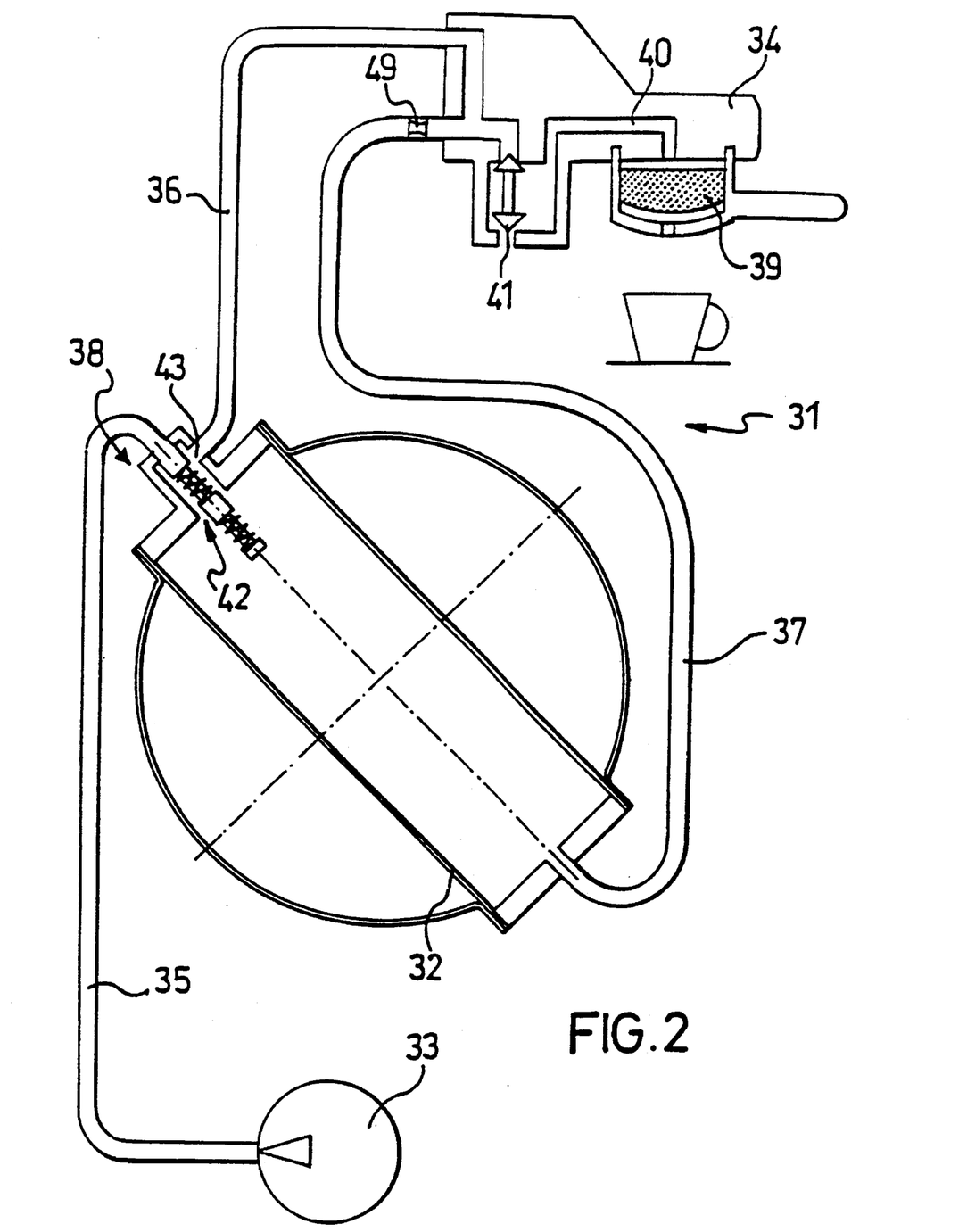
FIG. 2 is a schematic view of the water supply system in a second coffee maker embodying the invention.
Figure 3:
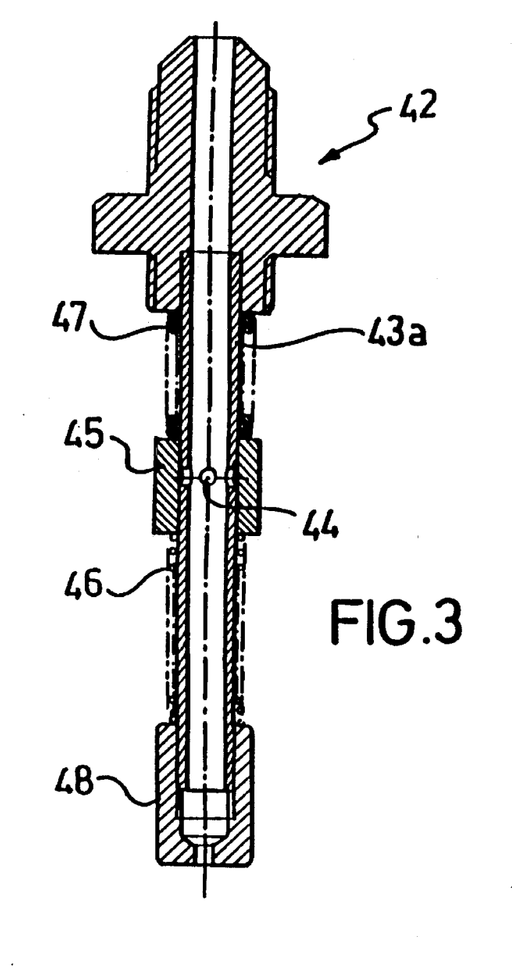
FIGS. 3 and 4 are enlarged scale views of a heat operated valve incorporated to the coffee maker of FIG. 2, as taken below and above the tripping temperature, respectively.
Figure 4:
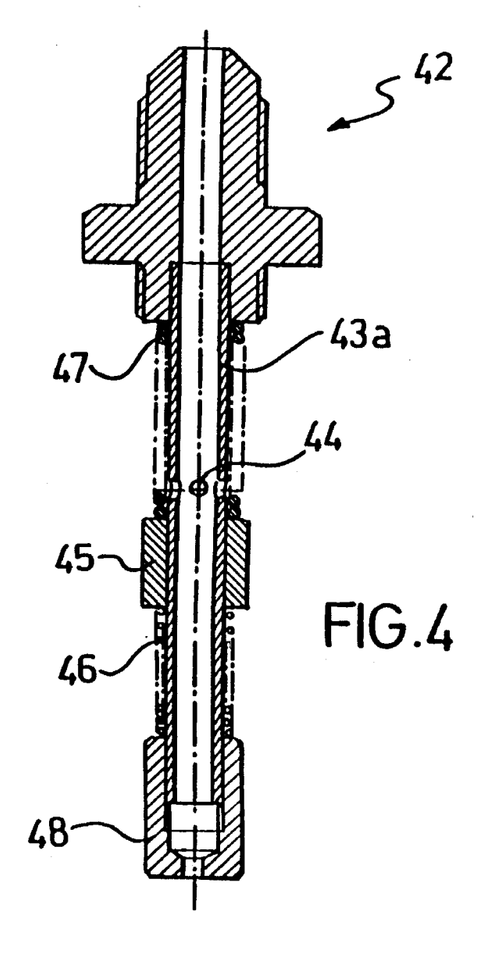

The second coffee maker, generally shown in FIG. 2 and partly detailed in FIGS. 3 and 4, comprises a water supply system, generally shown at 31, which connects together a heat exchanger 32, a feed pump 33, and a dispenser unit 34.

The water supply system 31 comprises a water feed pipe 35 between the pump 33 and the heat exchanger 32, a delivery pipe 36, and a return pipe 37 between the heat exchanger 32 and the dispenser unit 34. The water feed pipe opens into the heat exchanger 32 through a mixer unit 38, to control the inflow of cold water to the heat exchanger 32 and its mixing with heated water directed into the delivery pipe 36. The two delivery 36 and return 37 pipes are open to the interior of the heat exchanger 32 from opposite sides thereof, and are connected together at the dispenser unit 34, thereby a thermosiphon recirculation circuit between the heat exchanger 32 and the dispenser unit 34 is formed. The dispenser unit 34 also accommodates a percolator holder 39 which is connected to the delivery 36 and return 37 pipes through a dispensing pipe 40 controlled by a dispensation valve 41.

The water supply system 31 further includes a heat operated valve 42 incorporated to the mixer unit 38. In fact, the mixer unit 38 comprises a mixing chamber 43 confronting the heat exchanger 32 and having the feed pipe 35 and delivery pipe 36 open into it. The feed pipe 35 has a tubular injector 43a in continuation of the feed pipe 35 from the mixing chamber 43 to the heat exchanger 32; the injector 43a is provided with mixing ports 44 formed laterally thereof at the location of the mixing chamber. A sleeve-like shutter 45 is mounted onto the injector 43a slidably between a normal position (shown in FIGS. 2 and 4) where it uncovers the mixing ports 44 and a working position (shown in FIG. 3) where it covers said ports 44. On the sleeve-like shutter 45 there act, in opposite directions, a spring 46 and a bias element 47 in the form of a spring made of a shape-memory material; the spring 46 urges the shutter 45 toward its working position, whereas the bias element 47 urges the shutter 45 toward its normal position. The tubular injector 34a with the mixing ports 44, the sleeve-like shutter 45, the spring 46 and the bias element 47 form the heat operated valve 42.

The action of the bias element 47 overcomes the spring 46 when above the transition temperature of the shape-memory material; below that transition temperature, the bias element 47 will lose its elastic properties and allow the spring 46 action to prevail. Thus, the transition temperature of the shape-memory material of the bias element 47 will correspond to the tripping temperature of the heat operated valve 42.

The heat operated valve 42 also includes an adjustment bush 48 which is drilled and threaded and mounted on the end of the injector 43a to enable adjustment of the spring 46 force.

The thermosiphon recirculation circuit formed by the delivery pipe 36 and the return pipe 37 further includes a throttled section 49, preferably placed in the return pipe 37.

The second coffee maker shown in FIGS. 2, 3 and 4 operates as follows.

Under normal operating conditions, the heat operated valve 42 allows the cold water from the feed pipe 35 to be in part directed into the heat exchanger 32, where it becomes heated, and in part mixed, within the mixer unit 38, with the heated water from the heat exchanger 32. This enables the delivery pipe 36 to be supplied with water which has already been cooled to some extent.

The thermosiphon recirculation circuit formed by the delivery pipe 36 and the return pipe 37 with the throttled section 49 will keep the dispenser unit 34 at a suitable temperature to draw, from the water flowing to the dispensing outlet, a sufficient amount of heat to bring the water up to an optimum temperature for dispensation (in a similar manner to that previously discussed in connection with the coffee maker of FIG. 1 when operated under normal conditions).

A machine of this kind is eminently effective to dispense weak coffee using large amounts of water, with the temperature inside the heat exchanger 32 adequately elevated to cope with massive flow requirements, and accordingly, the heated water should be mixed to a certain degree directly with the cold feed water in order to have its temperature lowered before it is discharged into the delivery pipe 36. The elements of the water supply system 31, specifically the mixing ports 44 and throttled section 49, are sized to ensure proper operation in most circumstances.

However, on the occasion of weak coffee being repeatedly dispensed at short intervals or at the starting stage, for example, the heat exchanger 32 may be unable to supply adequately heated water to the dispenser unit 34; in such cases, the heat operated valve 42 would cover the mixing ports 44 and, therefore, bring the mixing process to a stop. The cold water would be all injected into the heat exchanger 32, which brings about a temperature increase in the water being dispensed and the dispenser unit 34 itself, thereby quickly restoring conditions to normal.

Figure 5:
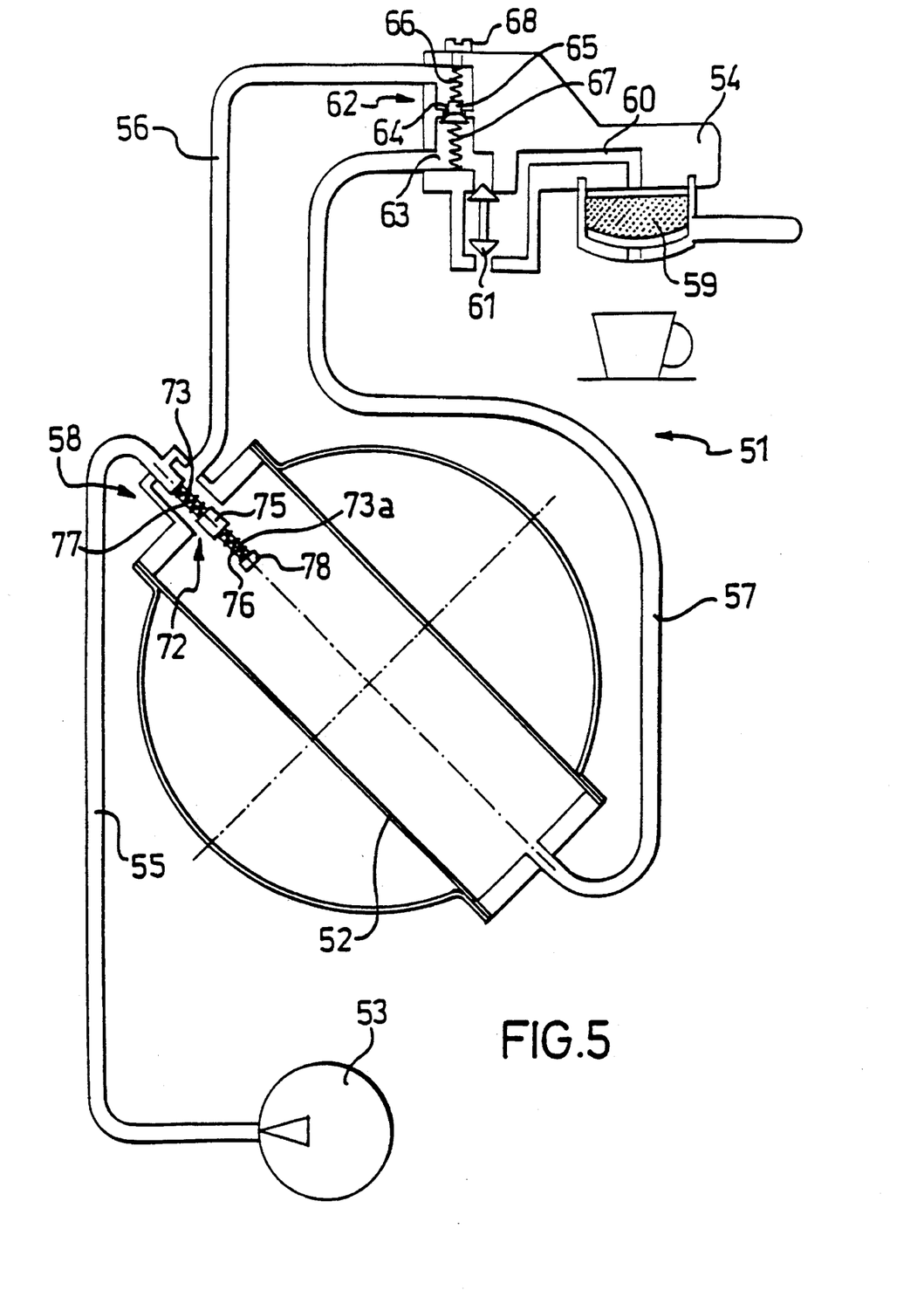
FIG. 5 is a schematic view of the water supply system in a third coffee maker embodying this invention.

The third coffee maker, as shown in FIG. 5, combines in itself the elements of the first and second machines, and hence, the self-regulating features of both.

Accordingly, the third coffee maker comprises a water supply system, generally shown at 51, which interconnects a heat exchanger 52, water feed pump 53, and dispenser unit 54.

The water supply system 51 comprises a water feed pipe 55 between the pump 53 and the heat exchanger 52, a delivery pipe 56, and a return pipe 57 between the heat exchanger 52 and the dispenser unit 54. The water feed pipe opens into the heat exchanger 52 through a mixer unit 58 to have the inflow of cold water to the heat exchanger 52 regulated and mixed with heated water directed to the delivery pipe 56. The two delivery and return pipes 56 and 57, respectively, open into the heat exchanger 52 from opposite sides thereof and are connected together at the dispenser unit 54 to provide a thermosiphon recirculation circuit for the heated water, between the heat exchanger 52 and the dispenser unit 54. The dispenser unit 54 also accommodates a percolator holder 59 which is connected to the delivery 56 and return 57 pipes by a dispensing pipe 60 controlled by means of a dispensation valve 61.

The water supply system 51 further comprises a first heat operated valve 62 for controlling the waterflow. The valve 62 comprises a chamber 63, formed serially in the thermosiphon recirculation circuit, a waterflow port 64 dividing the chamber 63 into two parts, and a shutter 65 which is guided for movement within the cheer 63 between a normal position (shown in FIG. 5) where it partly covers the waterflow port 64, and a working position where it uncovers said port 64. The shutter 65 is acted upon, in opposite directions, by a spring 66 and a bias element 67 in the form of a spring made of a shape-memory material; the spring 66 urges the shutter 65 toward its working position, whereas the bias element 67 urges the shutter 65 toward its normal position. The chamber 63 is in communication with the delivery 56, return 57 and dispensing 60 pipes.

The action of the bias element 67 overcomes that of the spring 66 when above the transition temperature of the shape-memory material; below said transition temperature, the bias element 67 would lose its elastic properties, so that the action of the spring 66 becomes dominant. Thus, the transition temperature of the shape-memory material of the bias element 67 will correspond to the working temperature of the heat operated valve 62.

The heat operated valve 62 also includes an adjustment screw 68 which allows the force of the spring 66 to be adjusted.

The water supply system 51 further comprises a second heat operated valve 72 connected in the mixer unit 58. In fact, the mixer unit 58 includes a mixing chamber 73 confronting the heat exchanger 52 and having the feed pipe 55 and return pipe 56 open thereinto. The feed pipe 55 is provided with a tubular injector 73a in continuation of the feed pipe 55 from the mixing chamber 73 to the heat exchanger 52. The injector 73a has mixing ports 74 formed laterally thereof at the location of the mixing chamber. A sleeve-like shutter 75 is mounted onto the injector 73a slidably between a normal position (shown in FIG. 5) where it uncovers the mixing ports 74 and a working position where it covers said ports 74. The sleeve-like shutter 75 is acted upon, in opposite directions, by a spring 76 and a bias element 77 in the form of a spring made of a shape-memory material; the spring 76 urging the shutter 75 toward its working position and the bias element 77 urging the shutter 75 toward its normal position. The tubular injector 54a with the mixing ports 74, the sleeve-like shutter 75, the spring 76 and the bias element 77 jointly form the heat operated valve 72.

The action of the bias element 77 will overcome that of the spring 76 when above the transition temperature of the shape-memory material; below that transition temperature, the bias element 77 would lose its elastic properties, whereby the action of the spring 76 becomes dominant. Thus, the transition temperature of the bias element 77 will correspond to the working temperature of the heat operated valve 72.

The heat operated valve 72 also includes a drilled and threaded adjustment bush 78 which is placed on the end of the injector 54a and allows the force of the spring 76 to be adjusted.

The third coffee maker shown in FIG. 5 operates similar to the first coffee maker as far as the first heat operated valve 62 is concerned, and similar to the second coffee maker as far as the second heat operated valve 72 is concerned.

Figure 6:
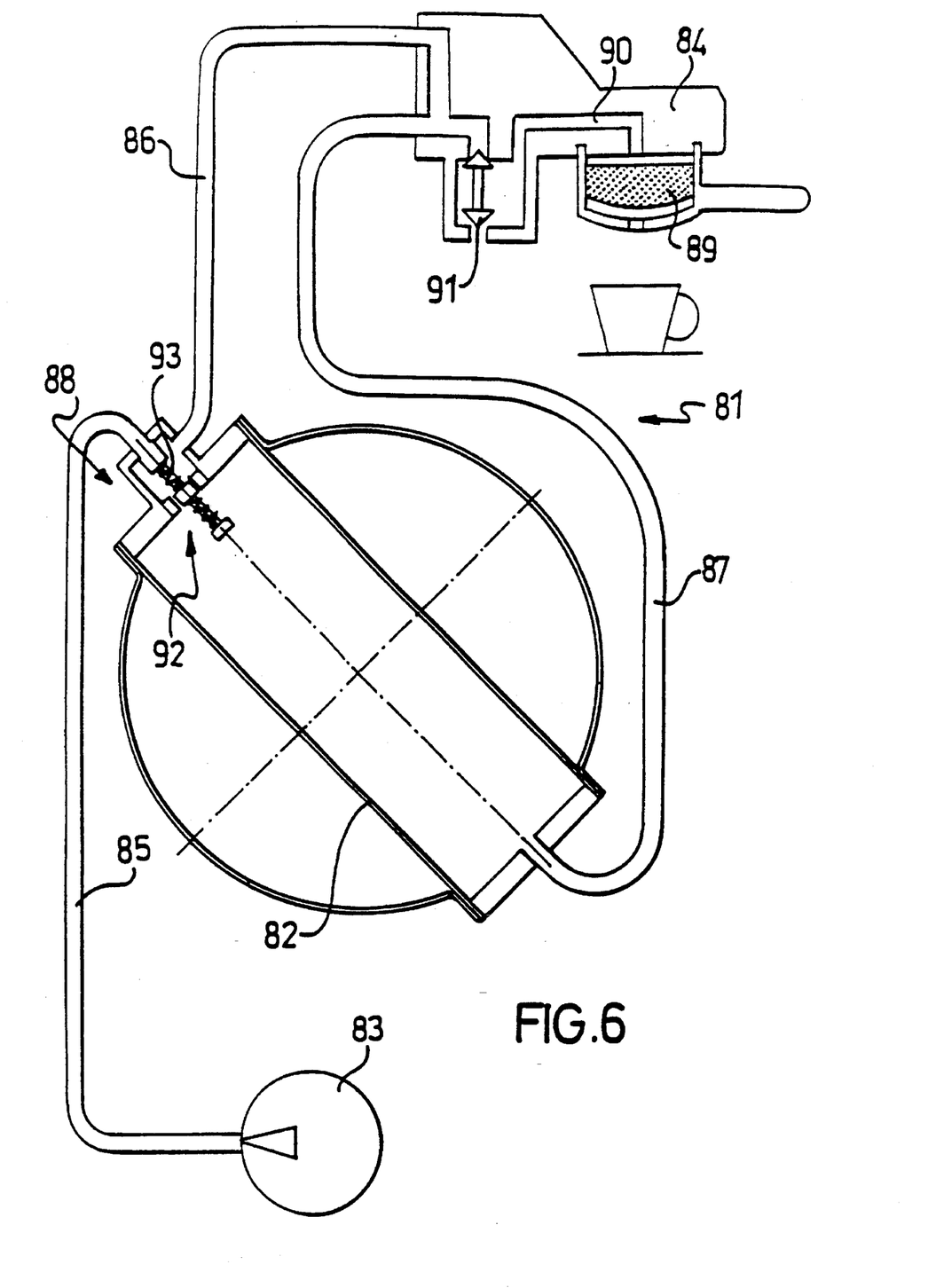
FIG. 6 is a schematic view of the water supply system in a fourth coffee maker embodying this invention.
Figure 7:
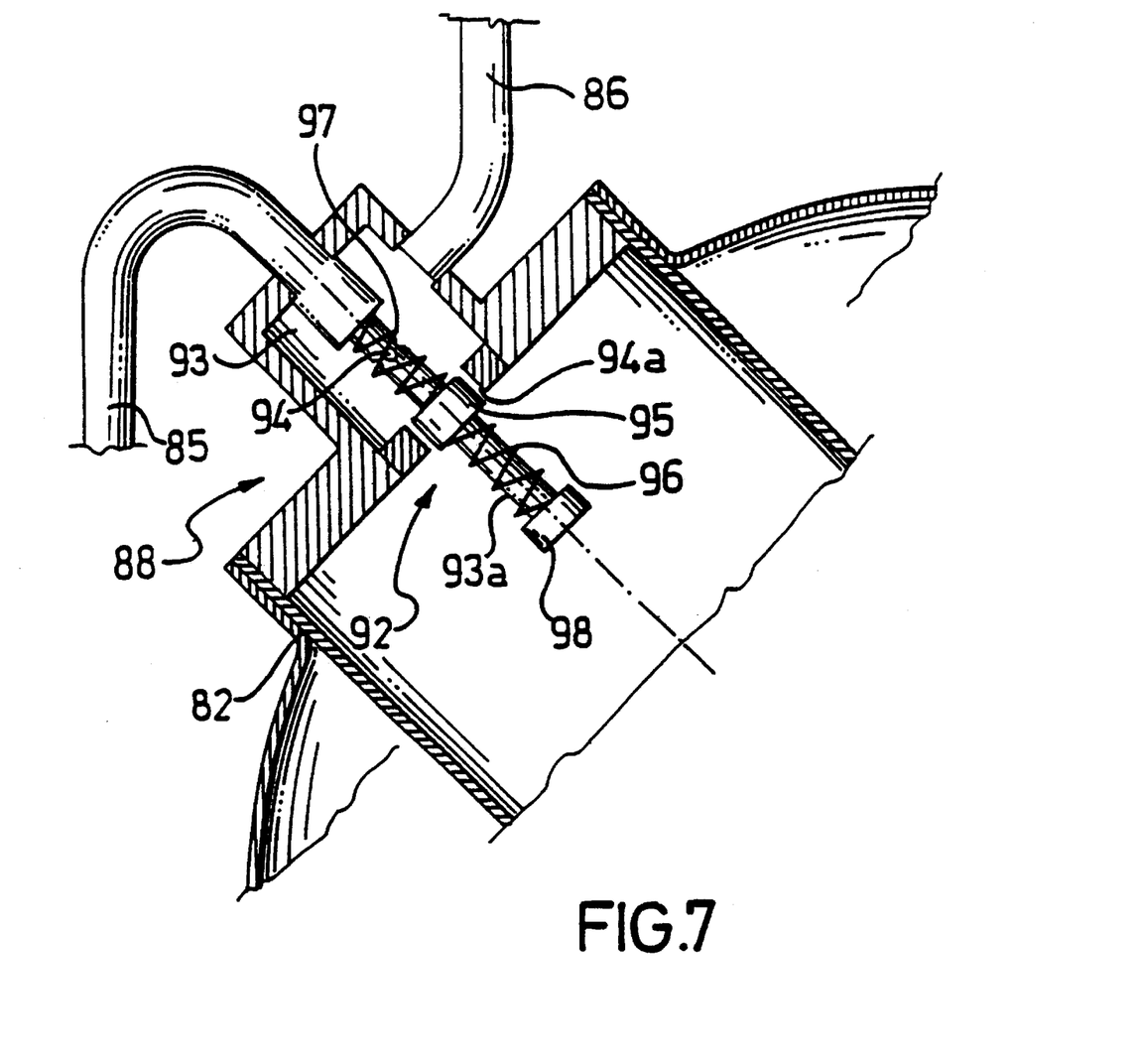
FIG. 7 is an enlarged scale view of a heat operated valve incorporated to the machine of FIG. 6.

The fourth coffee maker, shown generally in FIG. 6 and partially detailed in FIG. 7, has a single multi-function valve which combines in itself the functions of the first and the second heat operated valves, 62 and 72, of the third coffee maker.

This fourth coffee maker includes a water supply system, generally shown at 81, which interconnects a heat exchanger 82, a water feed pump 83 and a dispenser unit 84.

The water supply system 81 comprises a water feed pipe 85 between the pump 83 and the heat exchanger 82, a water delivery pipe 86 and return pipe 87 between the heat exchanger 82 and the dispenser unit 84. The water feed pipe opens into the heat exchanger 82 through a mixer unit 88 to regulate the inflow of cold water to the heat exchanger 82 and its mixing with heated water directed to the delivery pipe 86. The two delivery and return pipes 86 and 87, respectively, open into the heat exchanger 82 from opposite sides thereof and are interconnected at the dispenser unit 84 to provide a heated water thermosiphon recirculation circuit between the heat exchanger 82 and the dispenser unit 84. The dispenser unit 84 also accommodates a percolator holder 89 which is connected to the delivery 86 and return 87 pipes by a dispensing pipe 40 controlled by means of a dispensation valve 41.

The water supply system 81 further comprises a multi-function heat operated valve 92 incorporated to the mixer unit 88. In fact, the mixer unit 88 comprises a mixing chamber 93 confronting the heat exchanger 82 and having the feed pipe 85 and delivery pipe 86 open thereinto. The feed pipe 85 is provided with a tubular injector 93a in continuation of the feed pipe 85 from the mixing chamber 93 to the heat exchanger 82; the injector 93a has mixing ports 94 formed laterally thereof at the location of the mixing chamber. The heat exchanger 82 and mixing chamber 93 are communicated to each other by a waterflow port 94a.

A sleeve-like shutter 95 is mounted on the injector 93a slidably between a normal position (shown in FIGS. 6 and 7) where it uncovers the mixing ports 94 and partly covers the waterflow port 94a, and a working position where it covers the ports 94 and uncovers the port 94a completely. The sleeve-like shutter 95 is acted upon, in opposite directions, by a spring 96 and a bias element 97 in the form of a spring made of a shape-memory material; the spring 96 urging the shutter 95 toward its working position, and the bias element 97 urging the shutter 95 toward its normal position. The tubular injector 84a with the mixing ports 94, the sleeve-like shutter 95, the spring 96 and the bias element 97 jointly form the heat operated valve 92.

The action of the bias element 97 overcomes that of the spring 96 when above the transition temperature of the shape-memory material; below that transition temperature, the bias element 97 would lose its elastic properties and become dominant over the spring 96. Thus, the transition temperature of the shape-memory material of the bias element 97 will correspond to the working temperature of the multi-function heat operated valve 92.

The heat operated valve 92 further comprises a drilled and threaded adjustment bush 98 which is placed on the end of the injector 84a and enables the spring 96 force to be adjusted.

The fourth coffee maker shown in FIGS. 6 and 7 operates as follows.

Under normal conditions of operation, the multi-function heat operated valve 92 allows the cold water from the feed pipe 85 to be partly directed into the heat exchanger 82 to become heated, and partly mixed, within the mixer unit 88, with the heated water from the heat exchanger 82, whereby water already in a partly cooled state can be conveyed directly into the delivery pipe 86.

The thermosiphon recirculation circuit formed by the delivery pipe 86 and the return pipe 87 with the waterflow port 94a throttled down will keep the dispenser unit 84 at a suitable temperature to draw a sufficient amount of heat from the water directed to the dispensing outlet to bring the water up to its optimum dispensing temperature (similar to the previously discussed coffee maker in connection with FIG. 1 when operated under normal conditions).

The elements of the water supply system 81, specifically the mixing ports 94 and waterflow port 94a, are sized to enable proper operation in most circumstances.

However, on the occasion of repeated dispensation of very weak coffee at close intervals or at the starting stage, for example, the heat exchanger 82 may not supply adequately heated water to the dispenser unit 84; in that event, the multi-function heat operated valve 92 would be actuated to cover the mixing ports 44 and open the waterflow port 94a completely, thereby discontinuing the mixing process. All the cold water is injected into the heat exchanger 82, and the temperature of the water being directed into the delivery pipe 86 will be increased, as will the thermosiphon flow through the recirculation circuit; consequently, both the temperature of the water being dispensed and that of the dispenser unit 34 will be increased, and normal conditions be quickly re-established.

Figure 8:
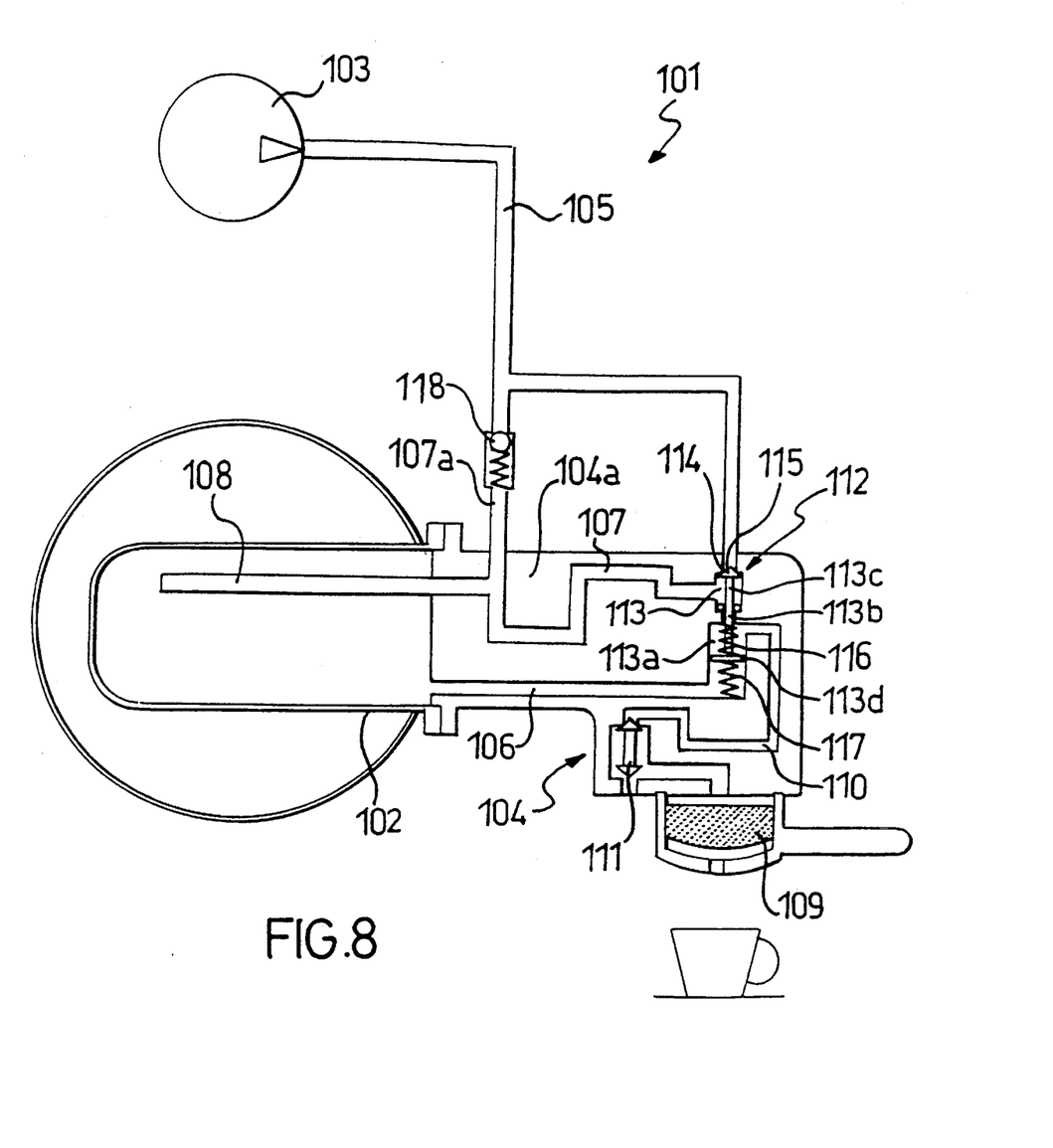
FIG. 8 is a schematic view of a water supply system in a fifth coffee maker embodying this invention.

The fifth coffee maker, as shown in FIG. 8, comprises a water supply system, generally indicated at 101, which interconnects a heat exchanger 102, water feed pump 103, and dispenser unit 104; the dispenser unit 104 is formed in a metal body 104a mounted directly onto the heat exchanger 102.

The water supply system 101 includes a water feed pipe 105 between the pump 103 and the heat exchanger 102, and a delivery pipe 106 between the heat exchanger 102 and the dispenser unit 104. The feed pipe 105 is made up of two sections in parallel with each other, namely a pre-heating/cooling section 107 and a bypass section 107a. The pre-heating/cooling section 107 extends through the metal body 104a to promote heat transfer between the feed water and the dispenser unit 104, whilst the bypass section 107a only extends through the body 104a to a shallow depth. The feed pipe 105 opens into the heat exchanger 102 through an injector 108 which reaches as far as the central area of the heat exchanger 102.

The dispenser unit 104 also accommodates a percolator holder 109 which is connected to the delivery pipe 106 by a dispensing pipe 110 controlled by means of a dispensation valve 111.

The water supply system 101 further includes a heat operated valve 112 for controlling the waterflow. The valve 112 comprises a main chamber 113 formed serially in the pre-heating/cooling section of the feed pipe, a pilot chamber 113a formed serially in the delivery pipe 106, a transfer port 113b between the chamber 113 and the chamber 113a, and a stem 113c slidable in sealed relationship within the port 113b and extending through both chambers 113 and 113a.

A waterflow port 114 is defined in the main chamber 113, and a shutter 115 is mounted on the stem 113c and is guided for movement, along with that stem 113c, between a normal position where it partly covers the waterflow port 114 and a working position (shown in FIG. 8) where it uncovers that port 114. A spring 116 and a bias element 117 in the form of a spring made of a shape-memory material act in opposite directions on a cap 113d mounted on the stem 113c inside the pilot chamber 113a, and therefore, indirectly on the shutter 115; the spring 116 urging the shutter toward its working position, and the bias element 117 urging the shutter 115 toward its normal position.

The action of the bias element 117 overcomes that of the spring 116 when above the transition temperature of the shape-memory material; below that transition temperature, however, the bias element 117 would lose its elastic properties, so that the action of the spring 116 becomes dominant. Thus, the transition temperature of the shape-memory material 117 will correspond to the tripping temperature of the heat operated valve 112.

The water supply system 101 further includes a control valve 118 in the bypass section 107a of the feed pipe 105 to only admit water through said section 107a from the pump 103 to the heat exchanger 102 (but not vice versa), and this only with the heat operated valve 112 in the closed condition.

The fifth coffee maker shown in FIG. 8 operates as follows.

Under normal conditions of operation, the heat operated valve 112 uncovers the waterflow port 114, and accordingly, water will be supplied to the heat exchanger 102 through the pre-heating/cooling section; as a result, the body 104a of the dispenser unit 104 will be cooled and, concurrently therewith, the feed water will be pre-heated.

Upon the temperature of the dispensation water within the pilot chamber 113a dropping below the tripping temperature, the shutter 115 will cover the waterflow port 114, thereby causing the feed water to flow directly into the heat exchanger 102 through the bypass section, that is, without cooling the body 104a of the dispenser unit 104. This effectively prevents any further cooling of the dispenser unit 104.

I claim:

1. An espresso coffee maker comprising a heat exchanger, at least one coffee dispenser unit, a water supply system in heat exchange relationship with said heat exchanger for supplying heated water to the coffee dispenser unit, wherein the water supply system comprises a cold water feed pipe to the heat exchanger, a pump connected in the water feed pipe, a heated water delivery pipe to the dispenser unit from the heat exchanger, a heated water return pipe to the heat exchanger from the dispenser unit, said delivery and return pipes forming a heated water thermosiphon recirculation circuit between the heat exchanger and the dispenser unit through which heated water flows by natural convection to transfer heat from the heat exchanger to the dispenser unit for heating the latter, wherein the water supply system comprises at least one heat operated control valve incorporated in the thermosiphon re-circulation circuit and including a chamber connected serially in the recirculation circuit, a transfer port for supplying water to the chamber, a shutter movable in the chamber between a normal position where it partly covers the port and a working position where it uncovers the port, a bias element made of a shape-memory material having a predetermined transition temperature and urging the shutter toward its normal position thus throttling down the transfer port when the temperature of the water through the recirculation circuit is above the transition temperature of the shape-memory material.

2. A coffee maker according to claim 1, wherein the heat operated valve includes a spring urging the shutter toward its working position against the bias element, the action of the bias element overcoming that of the spring when the temperature of the bias element is above the transition temperature of the shape-memory material.

3. A coffee maker according to claim 1, wherein the shape-memory material is a nickel/titanium alloy.

4. An espresso coffee maker comprising a heat exchanger, at least one coffee dispenser unit, a water supply system in heat exchange relationship with said heat exchanger for supplying heated water to the coffee dispenser unit, wherein the water supply system comprises a cold water feed pipe to the heat exchanger, a pump connected in the water feed pipe, a heated water delivery pipe from the heat exchanger to the dispenser unit, and a mixer unit on the heat exchanger for controlling the cold water inflow to the heat exchanger and mixing the cold water with heated water directed to the delivery pipe, wherein the water supply system comprises at least one heat operated control valve incorporated in the mixer unit including a mixing chamber at one end of the heat exchanger in communication with the water feed pipe and the delivery pipe, a tubular injector connected to the feed pipe from the mixing chamber to the heat exchanger, mixing ports in the injector wall in the mixing chamber, a shutter in the form of a slidable sleeve adapted to slide along the injector between a normal position where it uncovers the mixing ports and a working position where it covers the ports, a bias element made of a shape-memory having a predetermined transition temperature and urging the shutter toward its normal position, a spring urging the shutter toward its working position against the bias element, the action of the bias element overcoming that of the spring when the temperature of the bias element is above the transition temperature of the shape-memory material, thus allowing direct outflow of cold water from the feed pipe to the delivery pipe when the water inside the heat exchanger is at a temperature above the transition temperature of the shape-memory material and inhibiting said outflow when below said transition temperature, said injector, the mixing ports, the sleeve-like shutter, the spring and the bias element forming the heat operated control valve.

5. A coffee maker according to claim 4, wherein the shape-memory material is a nickel/titanium alloy.

6. An espresso coffee maker comprising a heat exchanger, at least one coffee dispenser unit, a water supply system in heat exchange relationship with said heat exchanger for supplying heated water to the coffee dispenser unit, wherein the water supply system comprises a cold water feed pipe to the heat exchanger, a pump connected in the water feed pipe, a heated water delivery pipe from the heat exchanger to the dispenser unit, a mixer unit on the heat exchanger for controlling the inflow of cold water to the heat exchanger and mixing of the cold water with heated water directed into the delivery pipe, a heated water return pipe from the dispenser unit to the heat exchanger, said delivery and return pipes forming a thermosiphon recirculation circuit for the heated water between the heat exchanger and the dispenser unit through which heated water flows by natural convection to transfer heat from the heat exchanger to the dispenser unit and have the latter heated, wherein the water supply system comprises at least a first heat operated control valve incorporated in the thermosiphon recirculation circuit and at least a second heat operated valve incorporated in the mixer unit, the first heat operated valve including a chamber connected serially in the recirculation circuit, a transfer port for supplying water to the chamber, a shutter movable in the chamber between a normal position where said shutter partially covers the port and a working position where said shutter uncovers the transfer port, a bias element made of a shape-memory material having a predetermined transition temperature and urging the shutter toward the normal position thus throttling down the heated water passageway when the water through the recirculation circuit is above the transition temperature of the shape-memory material, the second heat operated valve including a mixing chamber at one end of the heat exchanger and in communication with the water feed pipe and the delivery pipe, a tubular injector connected to the water feed pipe from the mixing chamber to the heat exchanger, mixing ports through the injector wall within the mixing chamber, a shutter in the form of a slidable sleeve movable along the injector between a normal position where the shutter uncovers the ports and a working position where the shutter cover the ports, a bias element made of a shape-memory material having a predetermined transition temperature and urging the shutter toward the normal position, a spring urging the sleeve-like shutter toward the working position against the bias element, the action of the bias element overcoming that of the spring when above the transition temperature of the shape-memory material, thus allowing direct outflow of cold water from the water feed pipe to the water delivery pipe when the water inside the heat exchanger is at a temperature above the transition temperature of the shape memory material and inhibiting said outflow when the water in the heat exchanger is at a temperature below said transition temperature, said injector, the mixing ports, the sleeve-like shutter, the spring and the bias element forming the second heat operated control valve.

7. A coffee maker according to claim 6, wherein the first heat operated valve includes a spring urging the shutter toward the working position against the bias element, the action of the bias element overcoming that of the spring when above the transition temperature of the shape-memory material.

8. A coffee maker according to claim 6, wherein the shape-memory material is a nickel/titanium alloy.

9. An espresso coffee maker comprising a heat exchanger, at least one coffee dispenser unit, a water supply system in heat exchange relationship with said heat exchanger for supplying heated water to the coffee dispenser unit, wherein the water supply system comprises a cold water feed pipe to the heat exchanger, a pump connected in the water feed pipe, a heated water delivery pipe from the heat exchanger to the dispenser unit, a mixer unit on the heat exchanger for controlling the inflow of cold water to the heat exchanger and mixing of the cold water with heated water directed into the delivery pipe, a heated water return pipe from the dispenser unit to the heat exchanger, said delivery and return pipes forming a thermosiphon recirculation circuit for the heated water between the heat exchanger and the dispenser unit through which heated water flows by natural convection to transfer heat from the heat exchanger to the dispenser unit and have the latter heated, wherein the water supply system comprises at least a multi-function heat operated valve incorporated in the mixer unit including a mixing chamber confronting the heat exchanger and in communication with the water feed pipe and the delivery pipe, a tubular injector connected to the water feed pipe from the mixing chamber to the heat exchanger, mixing ports through the injector wall within the mixing chamber, a transfer port between the heat exchanger and the mixing chamber, a shutter in the form of a slidable sleeve movable along the injector between a normal position where the shutter uncovers the mixing ports and partly covers the transfer port and a working position where the shutter covers the mixing ports and uncovers the transfer port, a bias element made of a shape-memory material having a predetermined transition temperature and urging the shutter toward the normal position, a spring urging the shutter toward its working position against the bias element, the action of the bias element overcoming that of the spring when above the transition temperature of the shape memory material to both prevent cold water from flowing directly into the delivery pipe from the feed pipe and open wide the passageway for the heated water from the heat exchanger to the delivery pipe when the water within the heat exchanger is below the transition temperature of the shape-memory material and allow some cold water to flow directly from the feed pipe into the delivery pipe and partially inhibit heated water from flowing from the heat exchanger into the delivery pipe when the water within the heat exchanger is at a higher temperature than said transition temperature, said injector, the mixing ports, the sleeve-like shutter, the spring and the bias element forming the multi-function heat operated valve.

10. An espresso coffee maker comprising a heat exchanger, at least one coffee dispenser unit, a water supply system in heat exchange relationship with said heat exchanger for supplying heated water to the coffee dispenser unit, wherein the dispenser unit is formed within a metal body which is attached directly to the heat exchanger and the water supply system comprises a cold water feed pipe to the heat exchanger, a pump connected in the feed pipe, a heated water delivery pipe from the heat exchanger to the dispenser unit formed in the body and a pre-heating/cooling section of the water feed pipe formed in the body of the dispenser unit to limit the heating thereof wherein the water supply system comprises at least one heat operated control valve, a bypass section located in the cold water feed pipe for bypassing the pre-heating/cooling section and a control valve located in the bypass section to only admit flow through said section from the pump to the heat exchanger when the heat operated valve is in a closed condition, the heat operated control valve including a main chamber provided serially in the pre-heating/cooling section, a waterflow port formed in the main chamber, a pilot chamber provided serially in the delivery pipe, a transfer port between the two chambers, a stem adapted to slide tightly within the transfer port and extending through both chambers, a shutter carried on the stem within the main chamber, a cap carried on the stem within the pilot chamber, the stem being movable between a normal position where the shutter uncovers the waterflow port and a working position where the shutter covers the waterflow port, a bias element made of a shape-memory material having a predetermined transition temperature and urging the stem with the shutter toward a normal position thus allowing direct outflow of cold water through the pre-heating/cooling section of the water feed pipe when the water in the delivery pipe is at a higher temperature than the transition temperature of the shape-memory material.

11. A coffee maker according to claim 10, wherein the heat operated valve includes a spring in the pilot chamber urging the stem with the shutter toward a working position against the shape-memory bias element, the action of the bias element overcoming that of the spring when above the transition temperature of the shape-memory material.

12. A coffee maker according to claim 10, wherein the shape-memory material is a nickel/titanium alloy.

* * * * *